Figure 1:
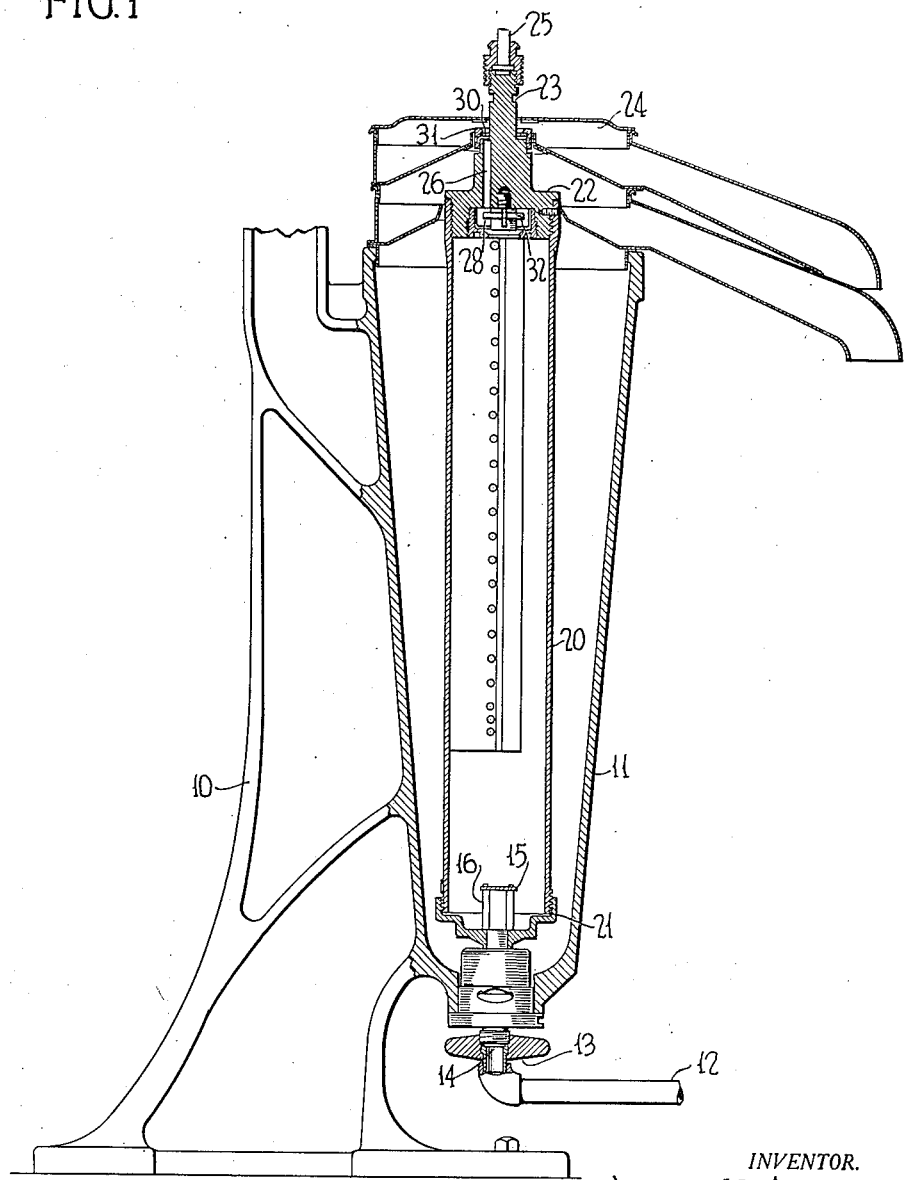

Jan. 12, 1937.  A. U. AYRES  2,067,590
CENTRIFUGAL SEPARATOR
Filed Sept. 12, 1932   4 Sheets-Sheet 3

INVENTOR.
ARTHUR U. AYRES
BY *Maurice A. Crews*
ATTORNEY.

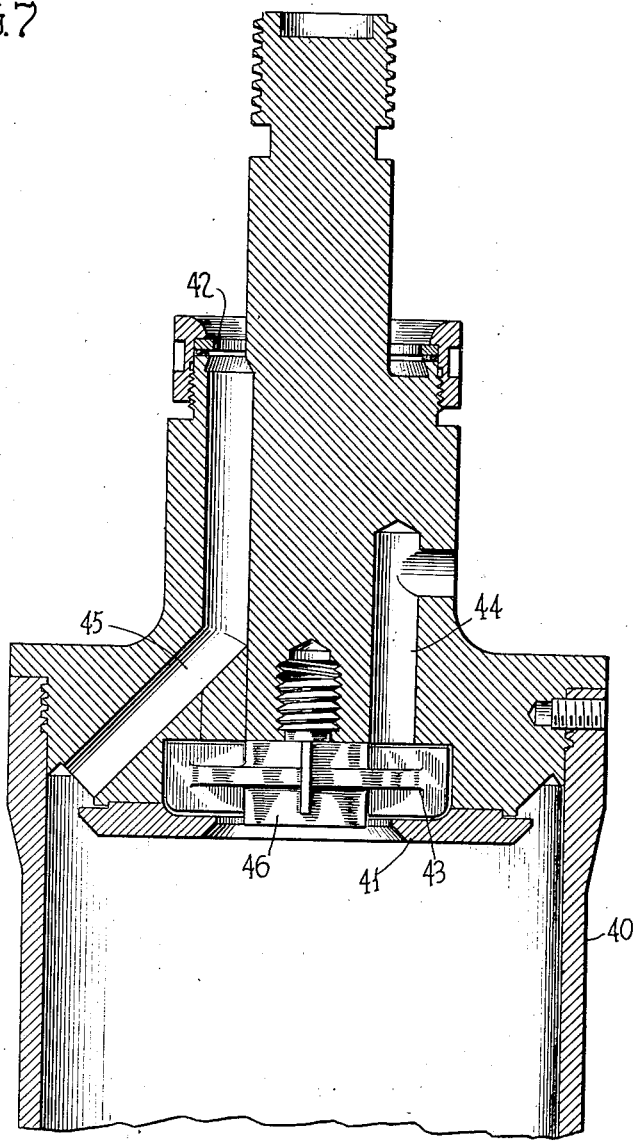

Patented Jan. 12, 1937

2,067,590

UNITED STATES PATENT OFFICE 2,067,590

CENTRIFUGAL SEPARATOR

Arthur U. Ayres, Chestnut Hill, Pa., assignor to The Sharples Specialty Company, Philadelphia, Pa., a corporation of Delaware Application September 12, 1932, Serial No. 632,730

8 Claims. (Cl. 233—13)

The present invention relates to methods of effecting separation of mixtures of solids and liquids or of a plurality of liquids into their constituents and to apparatus for carrying out such methods. The principal feature of the invention consists in a design of centrifugal bowl for effecting such a separation with a high degree of efficiency.

In the centrifugal separation of substances involving a continuous discharge of one or more of the substances from the bowl, and particularly in the centrifugal separation of solids from liquids, considerable difficulty has been encountered in attempting to effect an efficient elimination of impurities from the substances continuously discharged. Thus, in the separation of solids from liquids in which they are suspended, by the centrifugal sedimentation of the solids against the rotor of a centrifugal machine and the continuous discharge of liquids from a zone spaced radially inwardly of the wall of such rotor, it has been difficult to avoid the discharge of some solid particles with the liquid leaving the bowl even though it is known that their mass and size are such that deposition should occur under the force generated. Various theories have been advanced for the difficulty encountered in this connection. It was believed that the trouble was caused by turbulence within the rotor which impaired the flow of solids toward the bowl wall and tended to cause a re-suspension of solids which had already reached that wall under the influence of centrifugal sedimentation. While this phenomenon doubtless has an adverse effect upon the operation of the machine, I have found that it does not have such an important effect as does the tendency of air and other gases within the bowl to flow from the feed to the discharge outlets through the bowl. The velocity of the discharge of liquid from the bowl naturally causes a suction of gases in the direction of the flow of the liquid through the bowl. This suction induces air currents which flow directly from the feed opening through the discharge openings and gases carried into the rotor with the feed liquid or drawn in around the feed nozzle tend to entrain solid and liquid particles from the mixture entering the bowl and carry them directly through the bowl without permitting them to be subjected to the centrifugal action of the rotor.

My invention involves a solution of this difficulty by the provision of a zone of high pressure spaced from the feed opening of the bowl and thereby precluding the suction of gases through the bowl in the manner discussed above.

More specifically, I have provided a liquid seal which is adapted to prevent the flow of gases between these points. Thus, the invention contemplates in its preferred embodiment the provision of an imperforate disc secured to an imperforate central portion of the bowl and having sufficient diameter to enable its periphery to be submerged in at least the innermost zone of liquid which is being subjected to centrifugal treatment within the bowl. In order that such a disc may be submerged within the liquid, it is necessary that the pressure at its periphery be greater than the pressure of the atmosphere surrounding it. Since every particle of material which leaves the rotor must be subjected to this or a greater pressure, it will be obvious that there is no tendency to suck gases from the feed opening through this zone.

Figure 2:
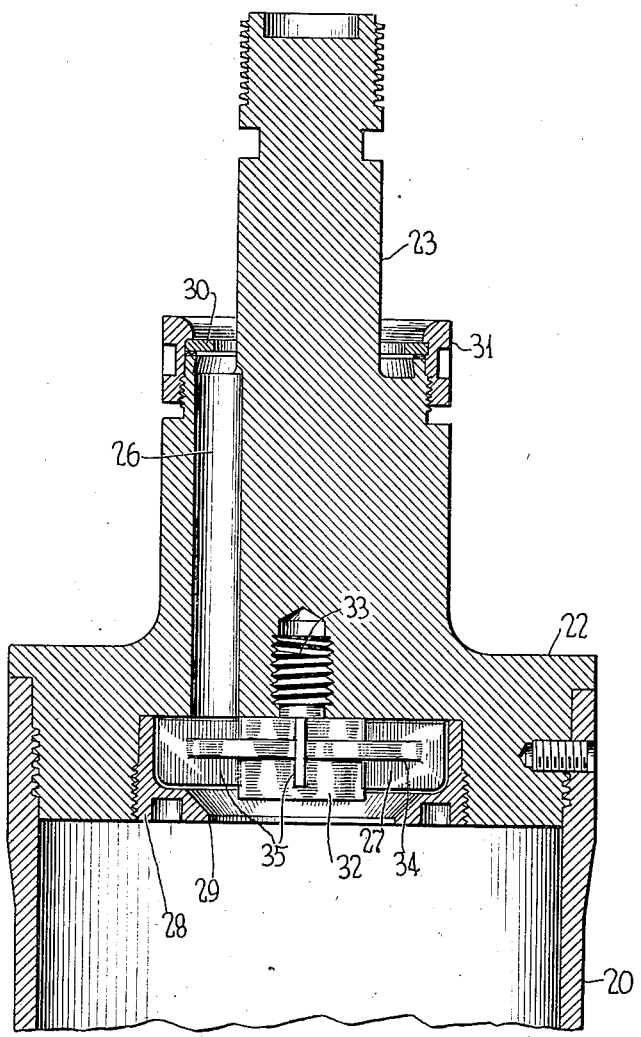
Figure 3:
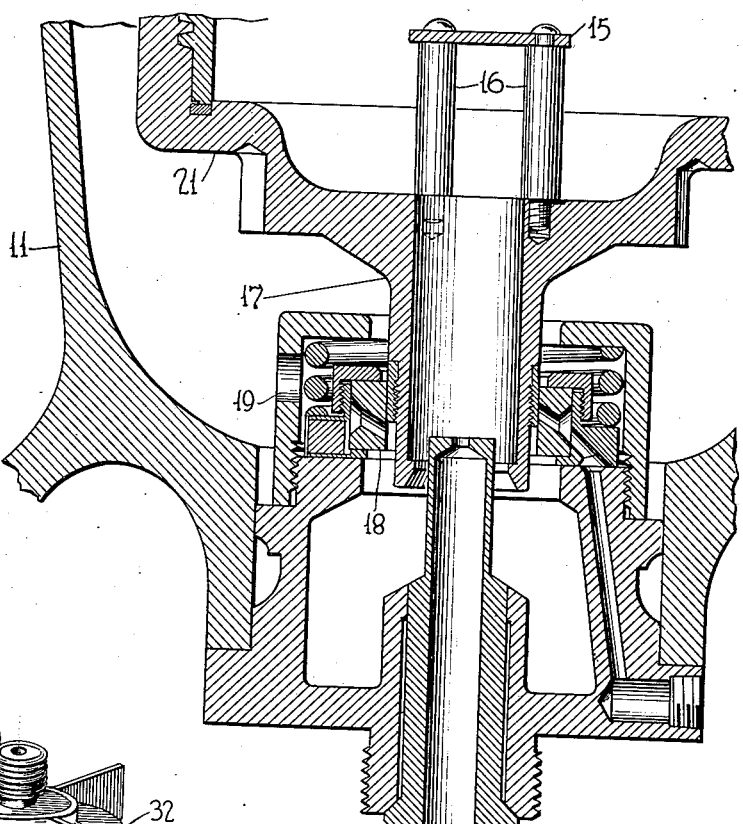
Figure 4:
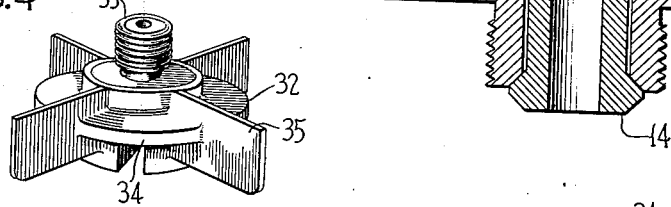
Figure 6:
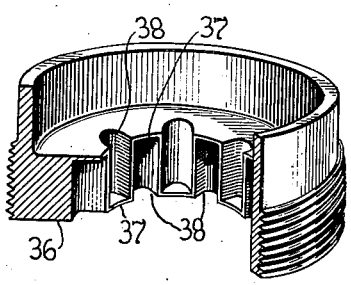
Figure 5:
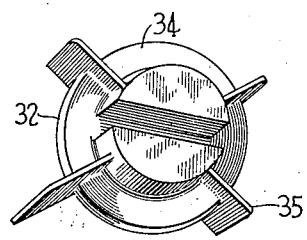

My invention will be better understood by a reference to the following specification in the light of the attached drawings, in which, Figure 1 is a general view, partly in section and partly in elevation, illustrating the general structure of a centrifugal machine for separating solids from a body of liquid by sedimentation, Fig. 2 is a detail sectional view through the upper end of the centrifugal bowl illustrated in Fig. 1, Fig. 3 is a similar detail sectional view through the lower end of this bowl, Fig. 4 is a top perspective view of a sealing disc for use in connection with such a bowl, Fig. 5 is a bottom perspective view of the part illustrated in Fig. 4, Fig. 6 is a detail view, partly in section, illustrating a modification, and Fig. 7 is a view corresponding to Fig. 2, illustrating the construction of a bowl adapted to effect a separation of two liquids from each other in accordance with my invention.

Referring to the drawings by reference characters, the numeral 10 designates the frame of a centrifugal separator which includes a casing 11 for the rotor of such a machine. The substance under treatment is fed to the rotor 20 which rotates within the casing 11 by means of a conduit 12 which is attached to a feed nozzle 14 by means of a removable connection 13. The feed and bearing features of the base portion of the rotor may be of any desired type but I prefer to employ connections of the type illustrated in the patent to W. H. Bath No.

1,750,154, March 11, 1930, for "Centrifugal machine." Such an arrangement involves a spreader disc 15 which is adapted to be secured within the body of the rotor by means of a plurality of posts 16 which space this spreader disc from the base of the rotor. The base 21 of the rotor is provided with a downwardly projecting boss 17 which bears within a bushing 18 which is secured within cushioned drag mechanism 19 of the general type illustrated in the aforementioned patent. Both the base 21 and the head 22 of the bowl are secured to its main body by means of screw-threaded connections. The head of the bowl is provided with a reduced neck 23 which passes through an arrangement of covers 24 adapted to receive the discharge from the bowl and direct this discharge outwardly. The neck 23 is secured to the drive spindle 25 by any suitable coupling connection and this drive spindle 25 is in turn connected to a source of power for rotating the bowl. A plurality of axially extending discharge passages 26 are arranged within the neck of the head of the bowl and are adapted to direct liquid passing from the main body of the bowl into the covers.

Insofar as it has been described above, the centrifugal separator to which my invention is applied conforms to well known principles of design. In the operation of such a machine liquid is injected through a reduced opening in the upper end of the feed nozzle 14 under pressure and impinges against the spreader disc 15 which causes it to flow outwardly against the periphery of the rapidly rotating bowl in the form of a thin spray. Such liquid will gradually fill the bowl, forming a vertically extending substantially cylindrical layer within the inner circumference thereof. The rotation of the bowl will be imparted to this cylindrical layer of liquid within it and this rotation will effect a movement of the solid particles suspended within the liquid against the periphery of the bowl under the influence of centrifugal force. When a layer of liquid sufficiently deep to overflow the discharge passages 26 and the ring dam controlling the depth of liquid has collected in the bowl, this liquid will begin to be discharged continuously into the cover 24. Solids which have been projected radially outwardly toward the peripheral wall of the bowl under the influence of centrifugal force will be retained within the bowl. In the use of such a machine in the manner just described a suction effect is induced by reason of the discharge of liquid from the bowl through the discharge passages 26. A further gas flow is caused by the action of centrifugal force induced by the bowl rotation upon the gas within the bowl. Such gases carry with them certain amounts of solid and liquid material, and material so entrained in the gas current is not thrown against the liquid layer and is not, therefore, subjected to the normal influence of the rotation of the bowl. As a consequence of this fact some solids are discharged with the liquids leaving the passages 26. The air current which constantly flows in a direction longitudinally of the bowl from its feed through its discharge opening, in turn causes a rapid flow of a thin liquid layer adjacent the innermost circumference of the liquid within the bowl in the same direction and neither this thin layer of liquid nor the solids entrained in it are subjected to adequate centrifugal treatment.

My invention comprises means for effectively precluding the flow of gases through the bowl in the manner above described. In order to attain this result I have formed an annular space 27 in the base of the head of the bowl and arranged a liquid sealing member within this space. The flow of liquid into this space is controlled by means of a discharge weir 28 which is provided with a thin annular lip 29 over which liquid is adapted to overflow into the space 27. A ring dam 30 secured to the neck of the bowl head adjacent its uppermost end controls the level of liquid within the main body of the bowl and the space 27, this ring dam being secured in position by an annular clamping nut 31. Within the annular space 27 I have secured a sealing member 32. This sealing member is provided with a threaded extension 33 through which it is secured to the head of the bowl and has an annular flange 34 which is of larger external diameter than the internal diameter of the ring dam 30 and therefore constantly dips into the liquid within the space 27 and constitutes a sealing disc to prevent the escape of gases with the liquid discharged. A plurality of wings 35 extending in a direction longitudinally and radially of the bowl are formed integrally with the sealing member or secured thereto and tend to effect the necessary acceleration and deceleration of the liquid incident to its passage around the annular flange 34.

In the operation of a centrifugal bowl provided with a sealing member of the above described type, it will be evident that every particle of material passing through the bowl must pass around the disc 34 constituting the flange of the sealing member and that this disc therefore embodies an effective liquid seal for the prevention of air currents within the bowl. As liquid entering the bowl is likewise under substantially constant pressure, it will be seen that there is no tendency to set up either a draft of air directly through the bowl or eddy currents within the bowl discharging through the feed nozzle. It is possible to reduce turbulence and increase the efficiency of the clarifying function by means of the special type of weir illustrated in Fig. 6. This weir 36 involves an extended edge 37 of zigzag form produced by cutting away the main body of the weir, as indicated at 38. By reason of its extended surface a gradual flow of liquid over the weir is possible without reducing the capacity of the machine.

In Fig. 7 I have illustrated the application of my invention to a bowl of the type in which two liquids are separated from each other. It will be understood, of course, that the same problem exists in a machine of this type in connection with the tendency of liquid entering the bowl to be entrained by air which tends to flow directly through the bowl from the feed through the exhaust opening, as exists in connection with the entrainment of solids in the clarifier type of bowl. The bowl 40 illustrated in Fig. 7 is provided with an inner ring dam 41 secured to the base of the bowl head and adapted to regulate the depth of liquid in the bowl and with a ring dam 42 arranged at the uppermost extremity of exhaust passages 45 for controlling the thickness of the heavier layer of liquid. As in the previous design, an annular space 43 is provided in the bowl head and liquid passing from the main body of the bowl into the discharge openings 44 must pass through this space.

The level of liquid within this space is determined by the outermost radial extremity of the openings 44 and a sealing member 46 of the same general type as that illustrated at 32 in the embodiment of Figs. 1 to 5 is provided with a sealing disc which extends radially outwardly into the liquid within the space 43 beyond this radial extremity and thus seals the discharge. It will be understood, of course, that it is only necessary to seal the innermost layer of liquid, for all of the liquid in the outermost layer is subject to the pressure of this innermost layer and the additional pressure caused by the effect of centrifugal force upon the outer layer of liquid and there is no contact between this outermost layer discharging through the openings 45 and the atmosphere within the bowl.

It will thus be seen that my invention contemplates in general means for forcing all of the liquid to pass through a zone of high pressure within the bowl at a zone removed a substantial distance from the feed openings. This high pressure is produced by means of a sealing disc and this disc is preferably arranged in a portion of the bowl beyond the zone of separation. In the two examples illustrated, it is arranged in the very head of the bowl beyond the main body in which such separation occurs. By arranging the disc in this zone, the increased velocity of the liquid passing around the disc does not disturb deposited solids.

While considerable advantages accrue from the arrangement of the sealing device beyond the upper end of the main body of the bowl, it is important to point out that even in cases where the disc dips into liquid in this main body, the sealing zone should be substantially removed from the zone of feed. Liquids entering the bowl are subject to no substantial centrifugal force until they abut the wall of the rotor or the layer of liquid within that wall. Such liquids travel a certain distance longitudinally of the bowl before they have been fully brought up to bowl speed and there is a considerable amount of swirling in the lower portion of the bowl incident to this acceleration of the liquid. During this accelerating period, gases may remain entrained in the liquid within the bowl and provision of a liquid seal adjacent this section of the bowl in which swirling occurs would not, therefore, completely seal the discharge from gases. The provision of a sealing member which dips into the liquid in a zone substantially removed from the zone of feed is therefore important because it avoids the possibility of the production of a suction effect tending to carry solids through the liquid discharge openings. Thus it will be seen that this suction effect has been avoided by locating the sealing zone a substantial distance from the zone of feed and that the disturbance of already deposited solids and the interference with the sedimentation operation by reason of turbulence have been avoided by locating the disc at the opposite end of the bowl from this zone of feed; i. e. in a zone beyond the zone of deposition of solids.

Modifications will be obvious to those skilled in the art and I do not therefore wish to be limited except by the scope of my sub-joined claims as interpreted in the light of the generic spirit of my invention.

What I claim is:

1. In a centrifugal separator, a rotatable bowl in which a separation of constituents of a mixture is adapted to take place under the influence of centrifugal force, means for feeding mixture to the bowl, means for discharging a liquid constituent from the bowl and imperforate means extending from a central portion of the bowl and submerged a relatively small depth in the liquid under treatment for directing all substances passing through the bowl continuously through a zone of high pressure between the zone of feed and the zone of ultimate discharge from the bowl, said last-named means being located adjacent the opposite longitudinal extremity of the separating zone of the bowl from the zone of feed.

2. In a centrifugal separator, a rotatable bowl in which a separation of constituents of a mixture is adapted to take place under the influence of centrifugal force, means for feeding mixture to the bowl, means for discharging a liquid constituent from the bowl, means for maintaining a given depth of liquid within the bowl, and an imperforate centrally arranged sealing member having a periphery of sufficient diameter to be submerged a relatively small depth in the liquid whose level is controlled by said last-named means, said sealing member being located adjacent the opposite longitudinal extremity of the separating zone of the bowl from the zone of feed.

3. In a centrifugal separator, a rotatable bowl having a main body portion in which a separation of constituents of a mixture is adapted to take place under the influence of centrifugal force, a head at one end of said main body portion for discharging a liquid constituent from the bowl, a base including feeding means at the opposite end of said main body portion, means for maintaining a given depth of liquid within the bowl, and a centrally arranged imperforate sealing member carried by said head, said sealing member having a periphery of sufficient diameter to be submerged a relatively small depth in the liquid within the bowl.

4. In a centrifugal separator, a rotatable bowl having a main body portion in which a separation of constituents of a mixture is adapted to take place under the influence of centrifugal force, means beyond said main body portion for discharging a liquid constituent from the bowl, means for maintaining a given depth of liquid within the bowl, a centrally arranged imperforate sealing member associated with a portion of the bowl opposite said main body portion with respect to said feeding means, said sealing member having a periphery of sufficient diameter to be submerged a relatively small depth in the liquid within the bowl, and means for maintaining the angular velocity of the liquid passing around said sealing member constant in the zone of said sealing member.

5. In a centrifugal separator, a rotatable bowl having a main body portion in which a separation of constituents of a mixture is adapted to take place under the influence of centrifugal force, means beyond said main body portion for discharging a liquid constituent from the bowl, means for maintaining a given depth of liquid within the bowl, a centrally arranged imperforate sealing member associated with a portion of the bowl opposite said main body portion with respect to said feeding means, said sealing member having a periphery of sufficient diameter to be submerged a relatively small depth in the liquid within the bowl, and means associated with said sealing member for maintaining the angular velocity of the liquid passing around said sealing member constant in the zone of said sealing member.

6. In a centrifugal separator, a rotatable bowl comprising a main body portion in which a separation of constituents is adapted to take place under the influence of centrifugal force, a head upon said main body portion, said head being provided with discharge passages, a sealing chamber within said head and connecting with said discharge passages, a centrally arranged sealing disc within said sealing chamber and having a circumference sufficient to immerse its periphery within the body of liquid within said sealing chamber, and an annular weir controlling the flow of liquid from said main body portion to said sealing chamber.

7. In a centrifugal separator, a rotatable bowl comprising a main body portion in which a separation of constituents is adapted to take place under the influence of centrifugal force, a head upon said main body portion, said head being provided with discharge passages, a sealing chamber within said head and connecting with said discharge passages, a centrally arranged sealing disc within said sealing chamber and having a circumference sufficient to immerse its periphery within the body of liquid within said sealing chamber, and an extended annular weir controlling the flow of liquid from said main body portion to said sealing chamber.

8. In a centrifugal separator, a rotatable bowl comprising a main body portion in which a separation of constituents is adapted to take place under the influence of centrifugal force, a head upon said main body portion, said head being provided with discharge passages, a sealing chamber within said head and connecting with said discharge passages, a centrally arranged sealing disc within said sealing chamber and having a circumference sufficient to immerse its periphery within the body of liquid within said sealing chamber, and an annular weir of zigzag shape controlling the flow of liquid from said main body portion to said sealing chamber.

ARTHUR U. AYRES.